E. E. GRAY.
GEAR SHIFTING MECHANISM.
APPLICATION FILED APR. 11, 1912.

1,272,423.

Patented July 16, 1918.
6 SHEETS—SHEET 5.

UNITED STATES PATENT OFFICE.

EDWARD E. GRAY, OF AURORA, ILLINOIS, ASSIGNOR TO GRAY PNEUMATIC GEAR SHIFT COMPANY, A CORPORATION OF ILLINOIS.

GEAR-SHIFTING MECHANISM.

1,272,423.

Specification of Letters Patent.

Patented July 16, 1918.

Application filed April 11, 1912. Serial No. 690,117.

*To all whom it may concern:*

Be it known that I, EDWARD E. GRAY, a citizen of the United States, residing at Aurora, in the county of Kane and State of Illinois, have invented certain new and useful Improvements in Gear-Shifting Mechanism, of which the following is a specification.

This invention relates to the operation and control of transmission mechanism, and is more particularly described as means for effecting the gear shifting operation in a transmission mechanism by the application of power from a foot lever or pedal.

The principal object of the invention is to provide a mechanism of this class which is simple and strong in construction and effective and efficient in operation.

More particularly, the object of the invention is to provide means for shifting the transmission gears into their various driving connections by the operation of the pedal or foot lever, in combination with the means for selecting the desired driving connection.

A further object of the invention is to provide means for locking the clutch device in an inoperative position while the selecting operation is taking place.

For the attainment of these ends, and the accomplishment of other new and useful objects, as will appear, the invention consists in the features of novelty in the construction, combination and arrangement of the several parts generally shown in the accompanying drawings and described in the specification, but are more particularly pointed out in the appended claims.

In the drawings Fig. 5 is a detail sectional view of a transversely extending shaft, the selecting and clutch operating mechanism; Figs. 6, 6ª, 7, and 7ª are detail views of the connectors at the end of the selector operating rod; Fig. 8 is a view of one of the selector operating arms with a selecting mechanism shown in section; Fig. 9 is a view of the end member of the operating device; Fig. 10 is a view of another of the gear selecting members.

Although the present invention is intended to be used in any connection where it is desired to effect the shifting of the gears of the transmission mechanism into their various driving connections, it is more particularly designed and in the present exemplification is particularly described as employed in connection with an automobile. The principal object of the invention is to provide means whereby the gear shifting operation may be effected by means of a foot lever or pedal which is the same pedal that controls the operation of the clutch mechanism, thereby obviating the presence of gear shifting levers at the side or in the center of the car and providing an easily operated means for effecting the desired driving connections. The present invention relates more particularly to the means for effecting the operation of the transmission mechanism by means of the foot pedal, and although it is necessary to employ some suitable selecting mechanism, it is not the subject of the present invention and is shown only for the purpose of presenting an operative structure. This feature of the present construction is particularly described and claimed in the applicant's co-pending application for transmission mechanism filed in the United States Patent Office on or about March 21, 1912, Serial Number 685,336. The present invention, however, as well as the selecting mechanism therefor, will be subsequently described in the specification, so that no reference need be made to the above mentioned co-pending application.

Referring now more particularly to the drawings, the numeral 21 will be employed to designate the frame to which the mechanism is secured or attached, and the numeral 22 will be employed to designate any suitable driving part, such, for example, as the fly wheel of an engine of any desired or suitable kind. A driving shaft 23 is provided which is connected by means of a clutch 24 to the driving member 22. As the specific construction of the clutch is not concerned in the present invention, it is shown diagrammatically in the drawings, and is provided with a clutch operating collar 25. A shaft 26 extends transversely across the frame 21 and is provided with suitable bearings at the ends thereof to permit the rotation of the shaft. A sleeve member 27 is mounted on the shaft which is provided with depending lugs 28, from which the bearing pivots 29 extend. These pivots are adapted to be inserted through perforations in the clutch collar 25 and the sleeve 27 is so located with respect to the clutch collar that when the sleeve member 27 is rotated the clutch collar will be moved to and fro along the driving shaft 23, whereby the clutch will be moved into and out of engaging position. When the clutch is in the driving shaft 23 will be, of course, rotated to rotate the transmission mechanism.

Figure 4:
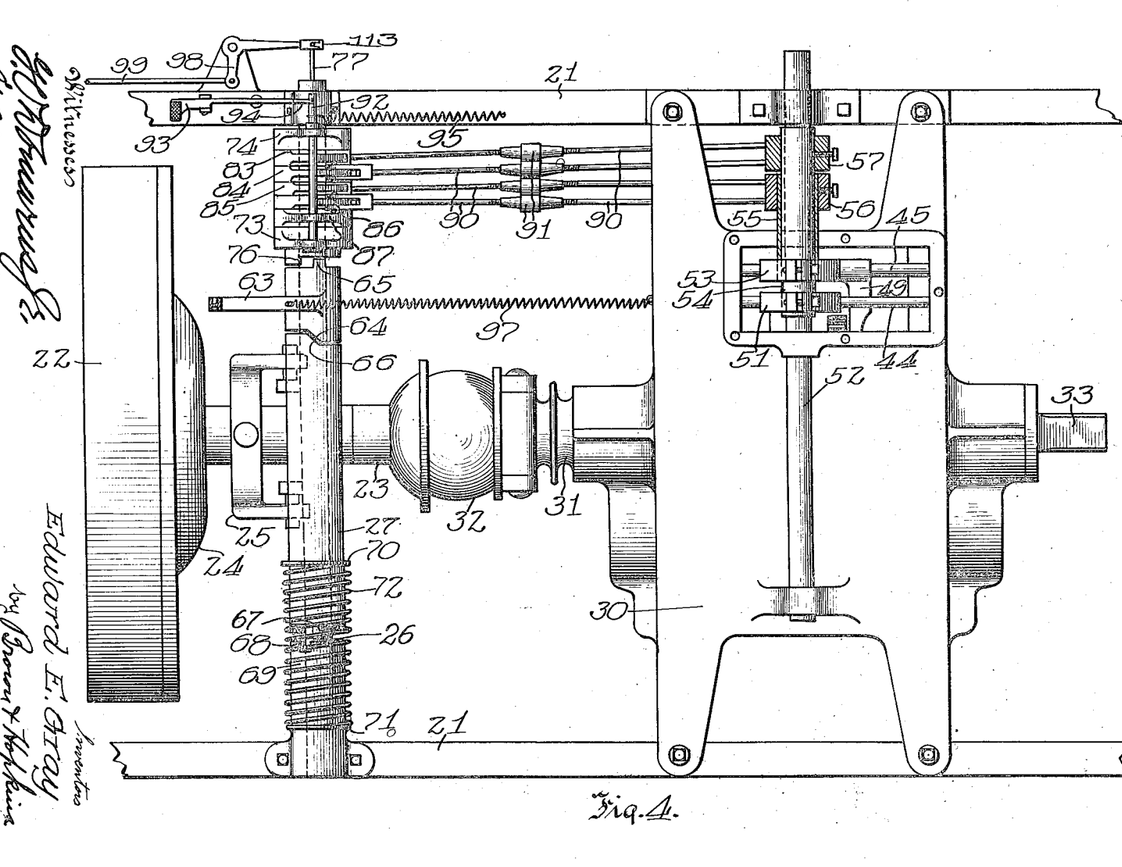
Fig. 4 is a plan view of apparatus shown in elevation in Fig. 1.

The transmission mechanism may be of any desired or suitable kind or construction, but preferably is of that class known in the art as the selective type. The casing for the transmission mechanism designated by the numeral 30 is preferably mounted on the frame 21 as shown, for example, in Fig. 4, and comprises the driving shafts 31 connected by means of the universal joint 32 to the driving shaft 23. Within the transmission casing and extending to the opposite edge thereof is a driving shaft 33, which may be connected to the rear axle or to any other suitable driving mechanism, and disposed within the casing 30 is a jack shaft 34. Mounted upon the jack shaft and upon the shafts 31 and 33 are the different gears 35, 36, 37, 38, 39, 40 and 41 for effecting the various driving connections between the shafts 31 and 33. It will be understood that the driving shafts 31 and 33 are separate from each other, but may be moved into direct driving connection by shifting one of the gears, as 40, until internal teeth mesh with corresponding projecting teeth, whereby they will be locked together. A separate gear 43 is mounted in the casing 30 which meshes with one of the gears 39 on the jack shaft and with which one of the driving gears 41 of the shaft 33 is adapted to mesh to effect a reverse driving connection. The gears 40 and 41 are movable upon the shaft 33 and are commonly provided with collars secured thereto or formed integral therewith by means of which their position may be varied and the gears may be brought into different driving engagements with the other gears.

Substantially parallel with the shafts in the transmission casing are bars 44 and 45, upon which the sleeve members 46 and 47 respectively are movable. These sleeve members are provided with yokes 48 and 49 respectively, which are adapted to engage with the collars on the slidable gears 40 and 41, so that it is necessary only to effect the movement of the sleeve members 46 and 47 upon their supporting bars to make the different driving connections.

As the construction so far described is or may be of any desired and suitable kind well known in the art, it is now necessary to enter into a more lengthy description of the function and operation of the several parts. It is intended only to show the connection and relation of these several parts whereby an operative structure is presented.

Figure 1:
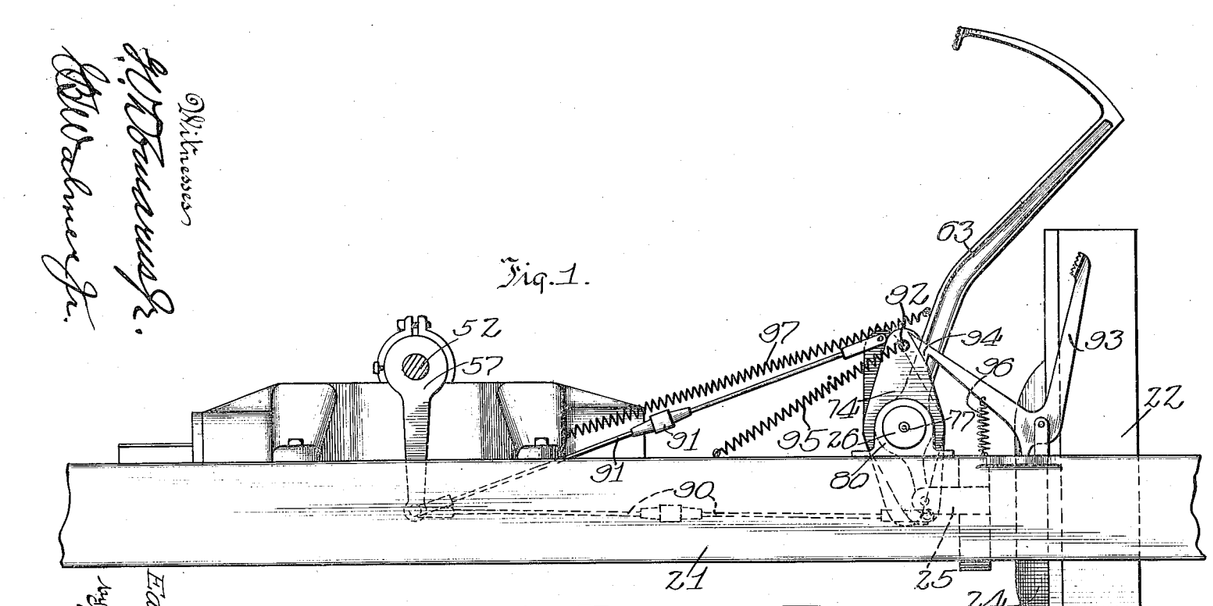
Figure 1 is a side elevation of apparatus embodying the principal features of my invention as employed in connection with an automobile, the frame of the automobile providing a support for the mechanism.
Figures 11, 12:
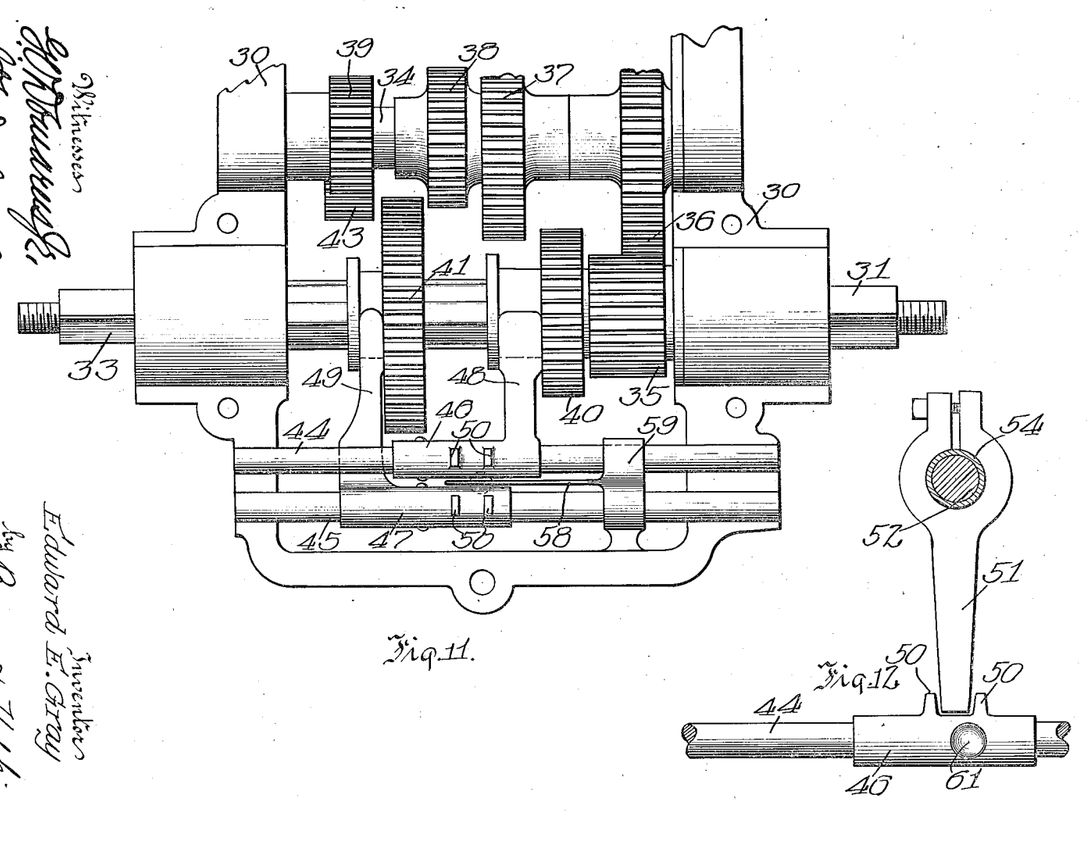
Fig. 11 is a plan view of the transmission gearing and the operating member therefor.
Fig. 12 is a detail view showing means for operating one of the gear shifting bars.

The sleeve members 46 and 47 are provided with lugs 50 (see also Fig. 12), and by inserting the end of an arm 51 between the lugs on one of the sleeves, the sleeve member may be moved by moving the arm 51. For this purpose a shaft 52 is provided which is preferably located above the bars 44 and 45, in the transmission casing, and extends substantially transverse thereof. Opposite the other sleeve 47 another arm 53 is disposed and these arms 51 and 53 are connected to sleeves 54 and 55 respectively, one of which is positioned within the other and both being positioned upon the shaft 52 about which they are freely rotatable and being also freely rotatable about each other. At the other end of these sleeves 54 and 55 are depending arms 56 and 57 secured thereto in any desired or suitable manner (see also Fig. 1). It will be evident from this description that in order to effect a change in the position of the gearings within the transmission casing it is necessary only to move one of the arms 56 or 57 in a forward or rearward direction from the central position.

Figures 13, 14:
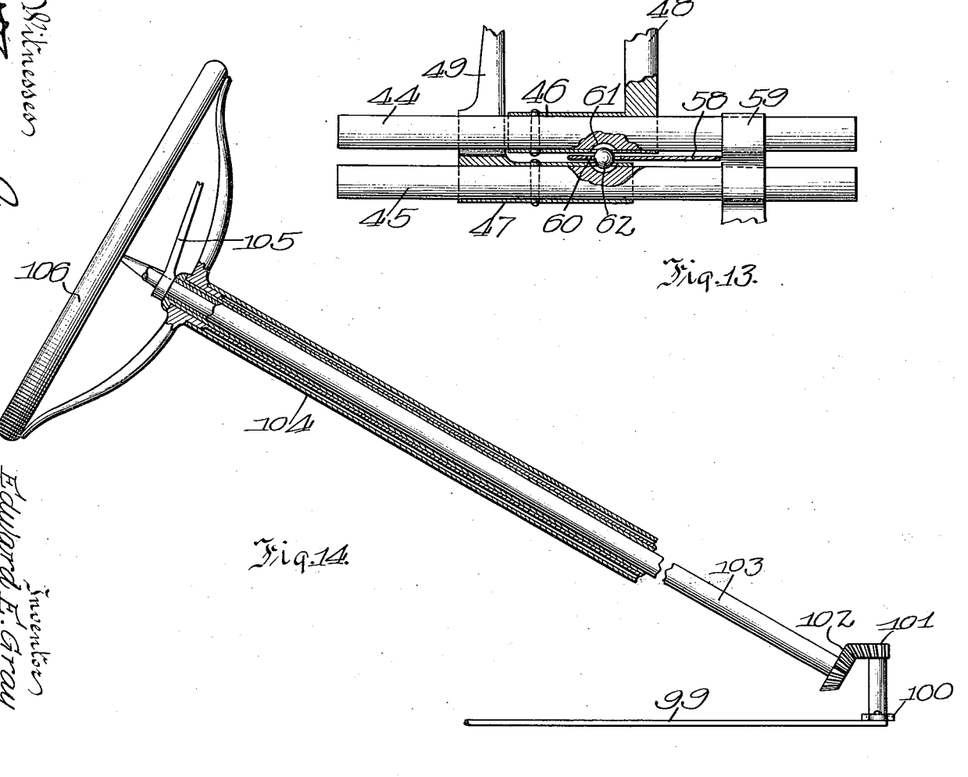
Fig. 13 is a detail view of the locking mechanism for the gear shifting bars.
Fig. 14 is a view partly in section of a steering post and wheel and provided with means for operating the selective mechanism.
Figures 15, 16, 17, 18:
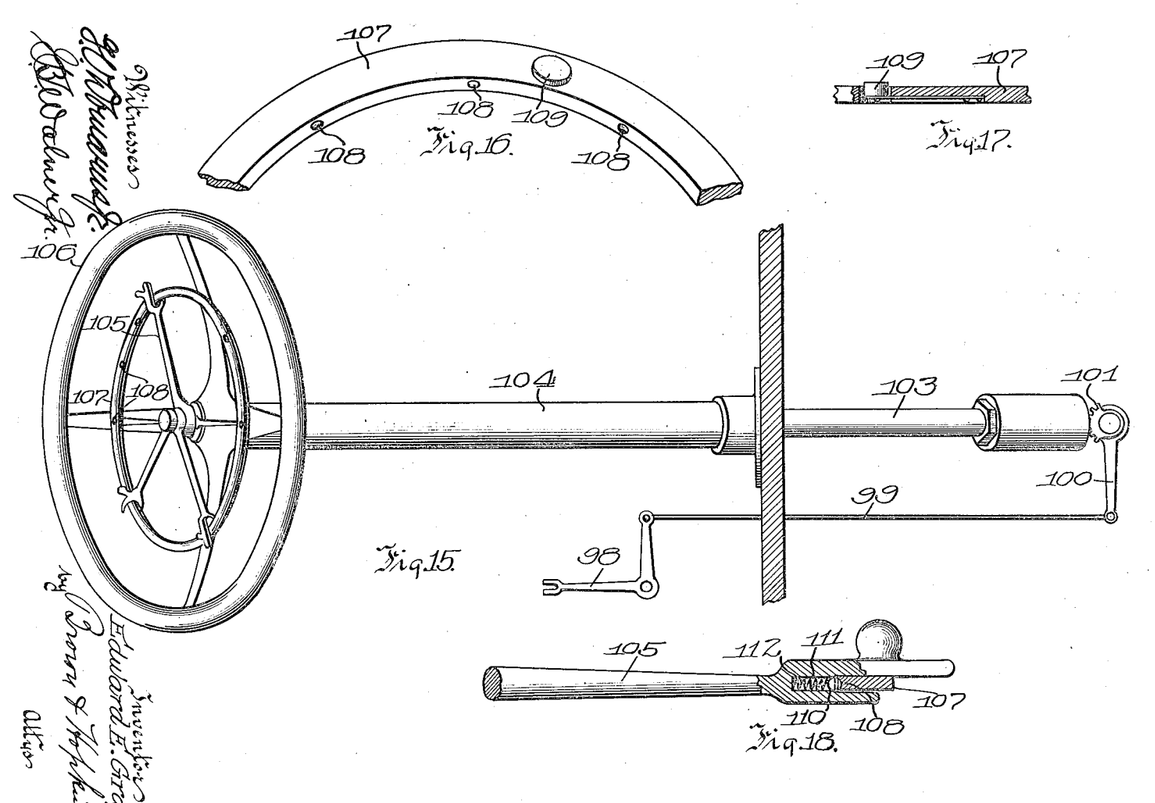
Fig. 15 is a plan view showing the preferred form of selecting mechanism as employed in connection with a steering wheel.
Fig. 16 is a detail view showing the position of stops in the indicating rim for the selecting mechanism.
Fig. 17 is a detail view showing a movable stop to limit the movement of the selecting levers.
Fig. 18 is a detail view of a ball locking mechanism to position the selecting lever.

In order to prevent the operation of both of the movable gears 40 and 41 at the same time, a construction similar to that shown in detail in Fig. 13 may be employed, which comprises a tongue 58 fixed with respect to the sleeve members by means of a member 59 in which there is a perforation 60. In the adjacent faces of the sleeves and disposed so that they will be opposite the perforation 60, when the gears are in their neutral position, are the depressions 61 (see also Fig. 12), and a ball 62 of a diameter to engage in one of the depressions but not in both simultaneously is disposed in the perforation in the tongue 58, so that when one of the sleeve members is moved the other will be located by means of the ball 62 which engages the tongue 58 and the opening 61 in the other sleeve member.

Freely mounted upon the shaft 26 is the foot lever or pedal 63 having a sleeve portion with an inclined surface 64, at one end, and a projecting lug 65 at the other end. Corresponding with the inclined surface 64 of this sleeve member is an inclined surface 66 on the sleeve member 27, which is inclined in a direction opposite to that of the sleeve member of the pedal. This sleeve member 27 is provided at its other end with a lug 67, which is adapted to engage in a recess 68 in a fixed bearing member 69 adjacent the end of the shaft 26. The rotation of sleeve 63 in the forward direction positively rotates sleeve 27 until its lug 67 engages in the fixed recess 68 of the member 69. Disposed upon the sleeve member 26 and the bearing member 69 are collars 70 and 71 against which collars a spring 72, wound about the members is adapted to bear, tending thereby to press the sleeve member 26 away from the fixed bearing member 69. Mounted at the other end of the shaft 26 and rotatable thereon, is an operating mechanism, comprising end members 73 and 74 connected by a sleeve portion 75. The end member 73 is provided with a shoulder 76 against which the lug 65 on the sleeve of the pedal is adapted to bear when the pedal is rotated to a predetermined position.

Figures 5, 6, 6A, 7, 7A, 8, 9, 10:
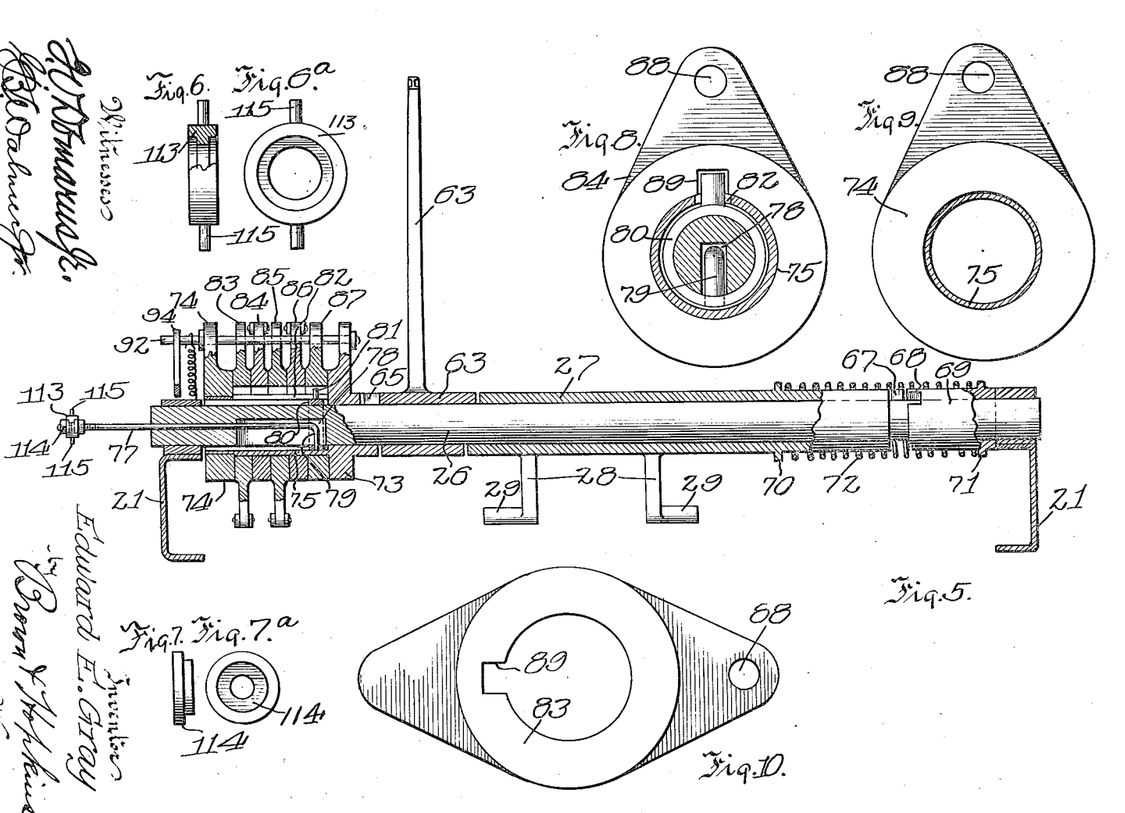

The selecting mechanism comprises a selector rod 77 which is inserted in an opening preferably at the end and extends into a recess 78 in the shaft where the rod is formed with a bent portion 79. The preferred shape of this recess is more closely shown by Fig. 8, in which it will be seen that the bent portion 79 of the selector substantially fills the recess. A collar 80 with a projection 81 is freely mounted upon the shaft 26 and a bent end 79 engages the collar so that it may be moved along the shaft in accordance with the movement of the selector bar 77. The sleeve portion 75 which connects the end members 73 and 74 is provided with a slot 82 through which the projection 81 extends, and mounted upon this sleeve portion 75 are a number of operating members 83, 84, 85 and 86, and with a neutral arm 87. Of these operating members two of them are of the form shown by Fig. 10, and the remainder of them are substantially of the form shown by Fig. 8, all being provided with openings 88 by means of which pivotal connections may be made therewith, and these openings 88 being disposed below the shaft 26 for part of the members and above the shaft for others. All of the members are also provided with notches 89 adapted to receive the projections 81 of the collar 80, so that when the members are in their normal position the notches 89 will register with each other and with the slot 82 and the collar 80 may be moved longitudinally of the shaft 26 by means of the selector bar 77 to any desired position.

Figure 2:
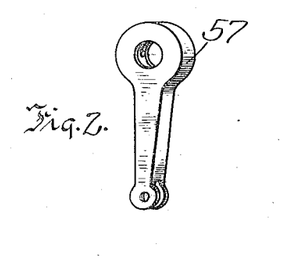
Figs. 2 and 3 are detail views of one of the operating levers of the gear shifting mechanism.
Figure 3:
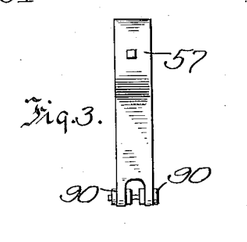

These operating members 83 to 86 inclusive are connected by means of the rods 90 to the arms 56 and 57 of the transmission mechanism, and it will be evident that two bars are connected to each of the arms, one from above the shaft 26 and one from below the shaft, so that with a single movement of the operating members, the arms 56 and 57 may be moved in either direction in accordance with the position of the selecting mechanism. To effect this movement of the operating mechanism the pedal 63 is rotated forwardly until the lug 65 engages the shoulder 76 on the end member 73, thereby causing the whole operating member to be rotated, carrying with it the selected operating member to effect the desired movement of the arm 56 or 57. If desired these rods 90 may be provided with turn buckles 91 by means of which they are adjusted to vary the length of the rods, and thereby to compensate for wear or other variation. The preferred form of the arms 56 and 57 is shown in Figs. 2 and 3, from which it will be evident that the outer end thereof is provided with a bifurcated portion which is adapted to receive the end connections of two of the rods 90.

Extending through the end members 73 and 74 is a bar 92 having a portion extending beyond the end member 74, and mounted upon a fixed portion of the frame 21 adjacent the end member 74 is a pivoted lever 93, preferably in the form of a V pivoted at the apex thereof, and having a latch 94 at the end of one of the arms which is positioned to engage the bar 92, as the operating member is rotated by means of the pedal 63. A spring 95 is provided which tends to return the operating member to its normal position at all times, and a spring 96 is provided in connection with the lever 93 tending to press it in engagement with the bar 92 so that whenever the operating member is rotated far enough the latch 94 will engage the bar and hold the operating member in this engaged position against the tension of the spring 95, so that it is necessary to press the other end of the lever 93 in order to release the operating member from its engagement therewith. The pedal 63 is also provided with a spring 97 which tends to return it to its uppermost position, which is the position in which the clutch is in engagement. In the position shown by Fig. 1 the pedal is presumed to be pressed slightly forward just before it reaches the neutral position, and as yet no gear has been selected, the selector collar being opposite the neutral member 87. It will be evident that this neutral member rotates when the operating member is rotated, but has no effect whatever upon the transmission mechanism, since there is no rod connected to the member 87.

In order to position the selector collar 80 along the shaft 26, it is necessary only to move the selector bar 77 in a lengthwise direction, and for this purpose a bell crank 98 is provided which is secured to any suitable part of the frame, one arm being connected to the end of the selector bar 77 and the other end to a rod 99 connected at the other end to a member 100, having a toothed segment 101 which meshes with a suitable gear 102 at the end of a sleeve 103, rotatable in the steering post 104, the sleeve having an arm 105 at the top of the post and inside of a steering wheel 106. An indicating segment 107 is provided with recesses 108 to indicate the various positions of the selector collar 80 on the shaft 26 and with a spring mounted stop 109 protruding through the upper face of the indicating segment 107 to prevent the movement of the lever 105 past a certain point without pressing the stop downwardly. The arm 105 is also provided with a ball 110 retained in a recess 111 at the end of the bar, the ball being pressed outwardly by a spring 112, so that it engages in the recess 108 to hold the lever 105 in any adjusted position.

In order to provide means to permit the rotation of the selector bar 77, the members 113 and 114 (see Figs. 6 and 7) may be provided. The member 113 is provided with projecting lugs 115, by means of which it is mounted in an arm of the bellcrank 98, and the members 114 are secured to the selector bar 77 and positioned one on each side of the member 113 so that the bar 77 may be rotated with respect to the member 113 without rotating the latter.

In operation it is evident that the position of the selector collar 80 may be varied as desired by simply varying the position of the arm or lever on the steering wheel. In order, therefore, to place the operating mechanism in condition for operation, it is necessary only to press the pedal 63 forward to the neutral position, at which time the clutch will be disengaged and the sleeve 27 will be moved by the inclined face 64 until the lug 67 engages in the recess 68. At this time the position of the selector collar may be varied until it is substantially in line with the operating member which it is desired to employ, and the further rotation of the pedal will cause the lug 65 to engage the shoulder 76 and thereby rotate the operating device, carrying with it the selected operating member. The bar 92 will then be engaged by the latch 94 of the lever 93, and the operating device will be held in this position, thereby preventing the collar 80 from being moved into any other position. At this time the rod 90 connected to the selected operating member will rotate one of the arms 56 or 57 about their axis to effect the corresponding change in position of the movable gear within the transmission case. It will be evident after this connection has been made, that the proper connection is made from the transmission shaft 23 through the universal shaft 32, and from the shaft 31 through the transmission gears to the shaft 33. It is necessary, therefore, only to allow the clutch to take hold, to complete a driving connection from the engine. The pressure on the pedal 63 is released, thereby allowing the spring 97 to draw the pedal rearwardly, which will allow the spring 72 to press the sleeve member 27 so that the lug 67 will not be engaged by the recess 68 and the clutch spring will therefore draw the clutch into driving engagement. It will be evident that in this connection, as long as the inclined surface 64 of the pedal is moved past the inclined surface 66 of the sleeve 27 in the forward direction of movement, that it will be impossible for the clutch to be placed in operative connection, and since the sleeve 27 must be in engagement with the notch 68 before the selector can be operated, that there will be no danger arising should the operator attempt to shift the gears when the clutch is in. Manifestly, this would be impossible with this construction, and this danger is obviated.

In order to change the selector mechanism from its operated position and to return it to neutral, it is necessary to release the bar 92 from the latch 94 by pressing on the lever 93, whereupon the operating device will assume its normal and neutral position by reason of the tension of the spring 95, whereupon it may be again selected and operated as before explained.

If it is desired to throw out the clutch at any time without changing the connection of the gearing, it is necessary only to press the pedal forward to the neutral position and to leave the operating device in engagement with the latch 94. By simply allowing the pedal to be drawn backwardly and the clutch to be thrown in by the pressure of its spring, the normal driving connection is made with the source of power without necessitating that any levers be changed in so doing.

While I have thus described the preferred embodiment of my invention, it is evident that others may make various changes in the construction, combination and arrangement of the several parts without departing from the spirit and scope of my invention as claimed.

What I claim is:—

1. A gear shifting mechanism comprising movable gears, means for selecting the desired gear to be moved, a foot pedal, and means connected to the pedal only to directly effect the selected gear change upon the positive actuation of the pedal.

2. In a gear shifting mechanism, the combination with variable transmission gearing, of means to shift some of the gears, a pedal to positively operate said means, and a mechanism for selecting a desired gear.

3. In a gear shifting mechanism, the combination with variable speed transmission gearing, of means to shift some of the gears, selecting mechanism for said means, and a single pedal to operate said means after the operation of the selecting mechanism.

4. In mechanism of the class described, the combination with variable speed transmission gearing, of means to shift some of the gears, selecting mechanism for said means, a pedal operative during part of its movement to operate said means after the operation of the selecting mechanism, and a spring pressed lever having a latch to engage the said means in its operated position and effective to retain it in such position until the lever is released.

5. In mechanism of the class described, the combination with variable speed transmission gearing, of means to shift some of the gears, selecting mechanism for said means, a pedal operative during part of its movement to operate said means after the operation of the selecting mechanism, and means tending to press said first named means to its inoperative position.

6. In mechanism of the class described, the combination with variable speed transmission gearing, of means to shift some of the gears, selecting mechanism for said means, a pedal operative during part of its movement to operate said means after the operation of the selecting mechanism, a spring pressed lever having a latch to engage the said means in its operated position and effective to retain it in such position until the lever is released, and means tending to press the first named means to its ineffectual position and operative to accomplish this result when the said lever is released.

7. In mechanism of the class described, the combination with variable speed transmission gearing, of a clutch to connect the gearing to a source of power, means to shift some of the gears, selective mechanism for said means, and a pedal operative to control the clutch and to operate said means upon its positive actuation.

8. In mechanism of the class described, the combination with variable speed transmission gearing, of a clutch to connect the gearing to a source of power, means to shift some of the gears, selective mechanism for said means, and a single foot pedal operative to control the operation of the clutch and to positively operate the said means during a part of the forward movement of the pedal.

9. In mechanism of the class described, the combination with variable speed transmission gearing, of a clutch to connect the gearing to a source of power, means to shift some of the gears, selective mechanism for said means, a pedal operative by its movement to control the operation of the clutch and the said means, and means operative at a certain point in the movement of the pedal to lock the clutch in a predetermined position.

10. In mechanism of the class described, the combination with variable speed transmission gearing, of a clutch to control the gearing to a source of power, means to shift some of the gears, selective mechanism for said means, a pedal operative by its movement to control the operation of the clutch and in part of the movement to effect the operation of said means, and means operative at a predetermined point in the movement of the pedal to lock the clutch releasably in a predetermined position.

11. In mechanism of the class described, the combination with variable speed transmission gearing, of a clutch to control the gearing to a source of power, means to shift some of the gears, selective mechanism for said means, a pedal operative by its movement to control the operation of the clutch and in part of the movement to effect the operation of said means, and means operative at a predetermined point in the movement of the pedal to lock the clutch releasably in a predetermined position, the said means being operated by the pedal after the clutch is in said locked position.

12. In mechanism of the class described, the combination with variable speed transmission gearing, of a clutch to connect the gearing to a source of power, means to shift some of the gears, selective mechanism for said means, a shaft extending transversely of the frame, a clutch operating sleeve freely rotatable upon said shaft, a pedal having a sleeve member rotatable on the shaft and portion to engage the said clutch operating sleeve, and to press it longitudinally on the shaft, and means to engage the said sleeve when so moved.

13. In mechanism of the class described, the combination with variable speed transmission gearing, of a clutch to connect the gearing to a source of power, means to shift some of the gears, selective mechanism for said means, a shaft extending transversely of the frame, a clutch operating sleeve freely rotatable upon said shaft, a pedal having a sleeve member rotatable on the shaft and with a portion to engage the said clutch operating sleeve to rotate it when the pedal is pressed and to move the sleeve along the shaft at a predetermined point, means to engage the sleeve, and means tending to press the sleeve in the other direction.

14. In mechanism of the class described, the combination with variable speed transmission gearing, of means to shift some of the gears, an operating device for said means comprising rotatable members mounted on the same axis, selecting means therefor, and means to rotate the selected members of the device to operate said means.

15. In mechanism of the class described, the combination with variable speed transmission gearing, of means to shift some of the gears, an operating device for said means comprising rotatable members, selecting means therefor, a pedal operative to rotate the selected member of said device, and means to hold the member in said rotated position.

16. In mechanism of the class described, the combination with variable speed transmission gearing, of means to shift some of the gears, an operating device for said means comprising rotatable members, selecting means therefor, a pedal operative to rotate the selected member of said device, and releasable means to hold the member in said rotated position.

17. In mechanism of the class described, the combination with variable speed transmission gearing, of means to shift some of the gears, an operating device for said means comprising rotatable members, selecting means therefor, a pedal operative to rotate the selected member of said device, and a lever having means to engage and hold the member in said rotated position, the lever being pivotally mounted and releasable from said engagement.

18. In mechanism of the class described, the combination with variable speed transmission gearing, of means to shift some of the gears, an operating device for said means comprising rotatable members, selecting means therefor, a pedal operative to rotate the selected member of said device, releasable means to hold the selected member in said rotatable position, and means to return the member to its normal position when the last said means is released.

19. In mechanism of the class described, the combination with variable speed transmission gearing, of selecting mechanism therefor, an operating device comprising end members spaced apart and connected by a slotted sleeve, intermediate members rotatable upon the sleeve and each having a notch which registers with the slot in the sleeve and with the notches when the members are in their neutral position, means to rotate the operating device and with it the selected member.

20. In mechanism of the class described, the combination with variable speed transmission gearing, of an operating device comprising end members, spaced apart and connected by a sleeve and rotatably mounted upon a shaft, the said sleeve being slotted between the end members, and operating members rotatable upon the sleeve, each having a notch which registers with notches in the other members and with the slot in the sleeve member, some of the members being perforated at the ends for pivotal connection.

21. In mechanism of the class described, the combination with variable speed transmission gearing, of levers for changing the driving connections thereof, rods to operate the said levers, an operating device for the rods, a shaft upon which said device is rotatable, the said device comprising end members spaced apart and connected by a slotted sleeve, the members being rotatable upon the shaft, operating members connected to the rods rotatable upon the sleeve, provided with notches to register with each other and with the slot in the sleeve when the device is in neutral position, some of the members being connected below the shaft to some of the said rods, others being connected above the shaft to other rods, one member being unconnected, a selector member movable upon the shaft having a lug which projects through the slotted sleeve and engages one of the operating members by means of its notch, means to rotate the device and the selected member to move one of the rods, means tending to return the device to a neutral position, a releasable latch operative to hold the device in its rotated position, and selecting mechanism operative to move the selector member along the shaft to engage the desired operating member when it is rotated with the said device.

In testimony whereof I have signed my name to this specification, in the presence of two subscribing witnesses, on this 8th day of April A. D. 1912.

EDWARD E. GRAY.

Witnesses:
ESMÉE WALTON,
K. W. WONNELL.